United States Patent [19]

Matsumura

[11] Patent Number: 4,458,286

[45] Date of Patent: Jul. 3, 1984

[54] ELECTRONIC DEVICE HAVING A HIGH VOLTAGE BREAKDOWN PROTECTION CIRCUIT

[75] Inventor: Eiichi Matsumura, Tokyo, Japan

[73] Assignee: Nippon Electric Co., Ltd., Tokyo, Japan

[21] Appl. No.: 413,206

[22] Filed: Aug. 30, 1982

[30] Foreign Application Priority Data

Aug. 31, 1981 [JP] Japan .................................. 56-129335

[51] Int. Cl.³ ............................................. H02H 3/20
[52] U.S. Cl. .................................... 361/91; 307/10 R
[58] Field of Search ....................... 361/18, 86, 90, 91; 307/10 R, 10 LS, 9

[56] References Cited

U.S. PATENT DOCUMENTS

| | | | |
|---|---|---|---|
| 4,005,342 | 1/1977 | Davis | 307/10 R X |
| 4,042,889 | 8/1977 | Baker | 361/91 X |
| 4,152,668 | 5/1979 | Kusumi | 361/91 X |

Primary Examiner—Harry E. Moose, Jr.
Attorney, Agent, or Firm—Sughrue, Mion, Zinn, Macpeak and Seas

[57] ABSTRACT

An electronic device for use in an automobile includes first and second power transistors connected in series between two power supply terminals, a first detector producing a first detection signal when the voltage difference between the two power supply terminals is larger than a first predetermined value, and a second detector producing a second detection signal when the voltage difference between the two power supply terminals is larger than a second predetermined value which is larger than the first value, the first power transistor being driven into cut-off in response to the first detection signal and a control current to be applied to the second power transistor being bypassed to one of the power supply terminals to keep the second power transistor conductive.

21 Claims, 2 Drawing Figures

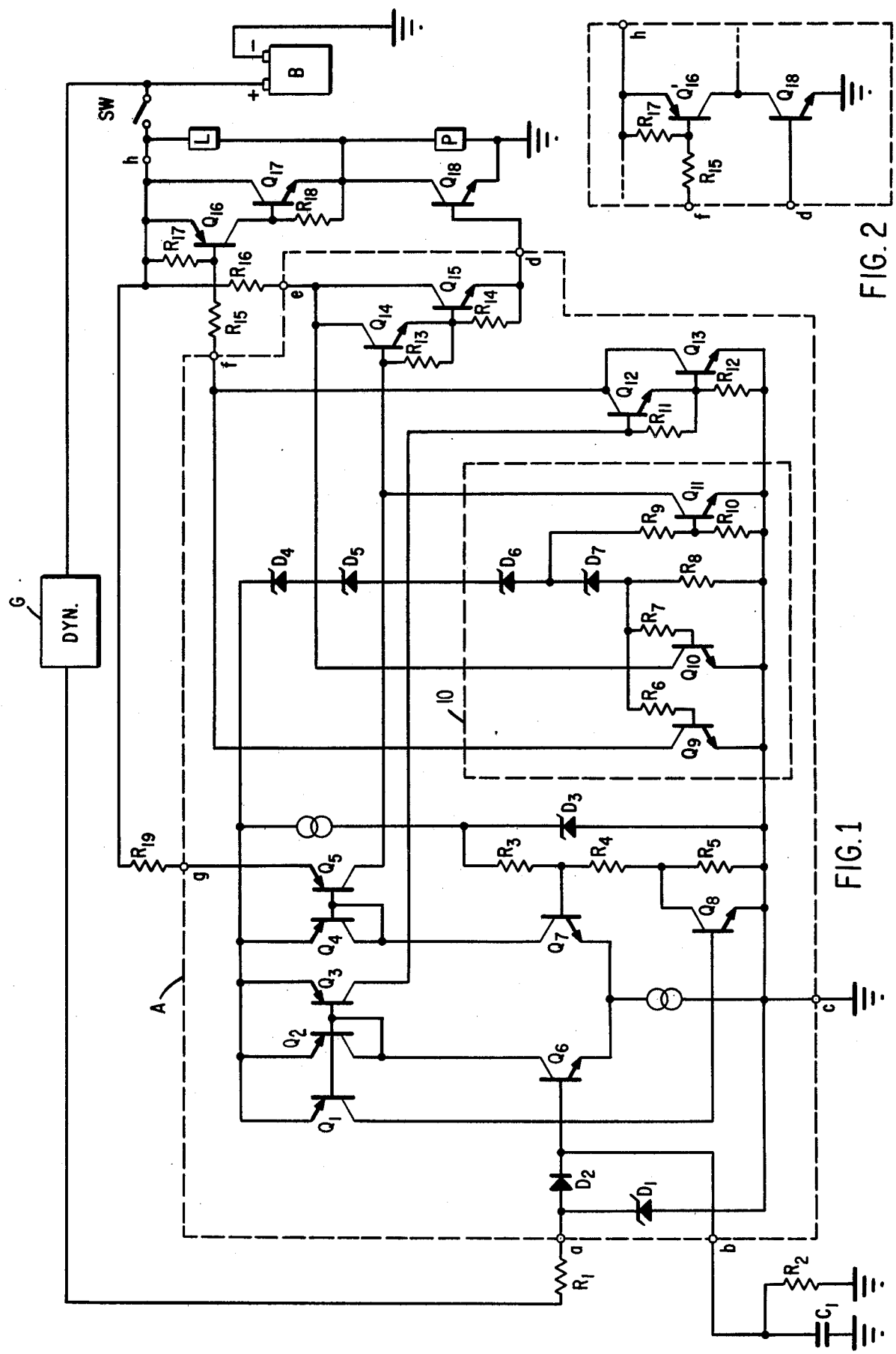

ELECTRONIC DEVICE HAVING A HIGH VOLTAGE BREAKDOWN PROTECTION CIRCUIT

BACKGROUND OF THE INVENTION

This invention relates to an electronic device having a protective circuit for protecting its circuit elements from breaking down due to abnormally high power voltage.

Such a protection function is especially necessary for the electronic devices in an automobile. Those electronic devices are usually energized by a storage battery which is normally charged by a dynamo rotating in synchronism with the engine. When the engine is running, the output power voltage of the dynamo is applied to both the electronic device and the storage battery. Accordingly, when the connection wire to the storage battery is accidentally disconnected from the battery, an abnormally high surge voltage appears at the output of the dynamo for a short time immediately thereafter. This causes a breakdown of electrical elements in the electronic devices.

SUMMARY OF THE INVENTION

It is a primary object of the present invention to provide an electronic device having a protection circuit for protecting the circuit elements of the device from breaking down due to an abnormally high power voltage.

According to the present invention, the electronic device includes detection means for providing first and second detection signals at excessive supply voltage values, a first protection circuit for disabling a first of two series-connected load driving transistors in response to the first detection signal, and a second protection circuit for lowering the voltage across the first and second transistor driving circuits to protect the driving circuits from breaking down.

According to a preferred embodiment of the present invention given by way of example hereinafter, the electronic device includes a power source terminal, a reference voltage terminal, first and second loads connected in series between the power source and reference voltage terminals, first and second transistors connected in series between the power source and reference voltage terminals, the first transistor controlling a current flowing through the first load and the second transistor controlling a current flowing through the second load, a first detector for producing a first detection signal when the voltage at the power supply terminal is higher than a first predetermined voltage, a second detector for producing a second detection signal when the voltage at the power supply terminal is higher than a second predetermined voltage which is higher than the first predetermined voltage, a first circuit driving the first transistor into cut-off condition in response to the first detection signal, and a second circuit responsive to the second detection signal for decreasing the power voltage applied to the first transistor driver to ensure cut-off of the first transistor. The second circuit also bypasses the second transistor driving current around the second transistor driver to protect it from breaking down.

The electronic device according to the present invention drives the first transistor into a cut-off condition when the power supply voltage is higher than a first predetermined voltage. Therefore, even if the second transistor is turned on by the abnormally high power voltage, the current flowing through the second transistor is limited by the cut-off condition of the first transistor with the result that both of the first and second transistors are prevented from breaking down. Further, the second protective circuit decreases the potentials across the first and second transistor driver circuits to protect the driver circuits themselves from breakdown. Still further, with the first transistor and one of the loads connected in parallel, the cutting off of the first transistor in response to the second detection signal results in the current of the second transistor being conducted to reference potential through the impedance of the one load, so that the current through the second transistor is limited to a reasonable value by the impedance of the load. The load impedance and saturation current of the second transistor can be selected to maintain the collector-emitter voltage of the second transistor in a desirable range to prevent the device from breaking down.

BRIEF DESCRIPTION OF THE DRAWINGS

The above and other objects and features of the invention will become more apparent from the following description taken in conjunction with the accompanying drawings, wherein:

FIG. 1 is a circuit diagram showing a first embodiment of the present invention; and FIG. 2 is a circuit diagram showing a part of a second embodiment of the present invention.

DETAILED DESCRIPTION OF THE INVENTION

The circuit shown in FIG. 1 is an electronic circuit used in an automobile, which controls the lighting of a charge lamp L and the heating of semiconductor resistor P which is used for controlling an automatic choke. The negative pole of a typical 12 V storage battery B is connected to the body or chassis of the car. The positive pole of the storage battery B is connected to an output of a dynamo G which is rotated in synchronism with the engine and generates a D.C. voltage slightly in excess of 12 V in cooperation with an incorporated voltage regulator. The alternator G has another output deriving a voltage from a part of a stator coil provided therein. A main part A of the electronic device circuit is formed as a semiconductor integrated circuit, and the power voltage is supplied to the electronic circuit through an ignition switch SW.

With the closing of the ignition switch SW, the engine starts running and rotates the dynamo G to generate a voltage. The voltage generated by the dynamo G rises with the rate of rotation of the engine, and when the voltage generated by the dynamo G becomes higher than the voltage of the battery B, the dynamo G begins charging the battery.

The voltage derived from a part of the stator coil in the dynamo G is connected to an input terminal a of the main circuit part A through a resistor $R_1$. A differential amplifier including transistors $Q_6$ and $Q_7$, serves as a comparator. A voltage supplied to a Zener dioded $D_3$ is divided by a resistor $R_3$ and a series connection of resistors $R_4$ and $R_5$, and the divided voltage is supplied to the base of the transistor $Q_7$ as a reference voltage. The voltage supplied to the first terminal a is rectified by a diode $D_2$ and smoothed by an integrating circuit of a resistor $R_2$ and a capacitor $C_1$. The resulting voltage is supplied to the base of the transistor $Q_6$.

When the voltage generated by the dynamo G is low so as not to charge the battery B, the voltage supplied to the first terminal a is also low so that a low potential is applied to the base of transistor $Q_6$. Under this condition, transistor $Q_7$ is rendered conductive to keep current mirror transistor $Q_4$ and $Q_5$ conductive. Transistors $Q_{14}$, $Q_{15}$, and $Q_{18}$ are driven by the current from transistor $Q_5$ to make an electric current flow through the charge lamp L to light the same. During this time, the transistor $Q_6$ is nonconductive to keep transistors $Q_2$, $Q_3$, $Q_{12}$, $Q_{13}$, $Q_{16}$, and $Q_{17}$ in the off state, and no current flows in the semiconductor resistor P.

An increase in the rate of rotation of the engine raises the generated voltage to render the voltage at a second terminal b higher than the base potential of the transistor $Q_7$. The transistors $Q_6$, $Q_2$, and $Q_3$ are then turned on, as well as another transistor $Q_1$, which turns on a shunt transistor $Q_8$. This turn-on of the transistor $Q_8$ shunts the electric current flowing through the resistor $R_5$ to lower the base potential of the transistor $Q_7$, so that the transistor $Q_7$ is rapidly cut off. As a result, the transistors $Q_4$, $Q_5$, $Q_{14}$, $Q_{15}$, and $Q_{18}$ are turned off to put out the charge lamp L. On the other hand, the conduction of the transistor $Q_3$ drives the transistors $Q_{12}$ and $Q_{13}$ to render the transistors $Q_{16}$ and $Q_{17}$ conductive and thereby supply an electric current to the semiconductor resistor P, which serves as a heat source for a bimetal for use in controlling the opening and closure of the automatic choke.

Although the protection circuit 10 for protecting circuit elements from breaking down due to abnormally high voltage is an essential part of the invention, the operation of the electronic circuit which does not have the part 10 will first be explained. If the connection wire to the battery B is accidentally disconnected when the engine is running, the dynamo produces an abnormally high surge voltage from the output of its voltage regulator because the load impedance of the voltage regulator momentarily becomes "0" just after the disconnection. The peak value of the surge voltage reaches 80 V, but it becomes lower after some time has elapsed (for example, 140 msec). This abnormally high surge voltage is applied to the electronic circuit through the ignition switch SW.

When the electronic circuit does not include the protector circuit 10, the excessive surge voltage is impressed on the main part A of the electronic circuit through resistors $R_{15}$, $R_{16}$, $R_{17}$, and $R_{19}$. A semiconductor integrated circuit usually has a relatively low withstanding voltage of about 40 volts. Since the main part A is formed as a semiconductor integrated circuit, the transistors $Q_{12}$ and $Q_{13}$ and the transistors $Q_{14}$ and $Q_{15}$ may break down to simultaneously drive all of the transistors $Q_{16}$, $Q_{17}$ and $Q_{18}$, to thereby cause an excessive current to flow through the transistors $Q_{17}$ and $Q_{18}$. As a result, either or both of the transistors $Q_{17}$ and $Q_{18}$ will break down.

However, since the invention provides a protective circuit 10, the breakdown of any of the transistors $Q_{12} \sim Q_{15}$ and $Q_{16} \sim Q_{18}$ is effectively prevented when the power supply voltage becomes abnormally high. The protective circuit 10 includes a voltage divider comprising a series connection of four Zener diodes $D_4$, $D_5$, $D_6$ and $D_7$ and a 10KΩ resistor $R_8$. When the power voltage is below 24 volts, all of the Zener diodes $D_4$, $D_5$, $D_6$ and $D_7$ remain cut-off. Thus, the base voltages of all transistors $Q_9$, $Q_{10}$ and $Q_{11}$ are kept low to render them nonconductive. Under this condition, the protective circuit 10 does not interfere with the normal operation of the transistors $Q_{12} \sim Q_{18}$.

With such a protector circuit, when a high voltage is applied to a power source terminal h and to a terminal g through a resistor $R_{19}$, the three Zener diodes $D_4$, $D_5$, and $D_6$ are rendered conductive to from a current path flowing through a 20KΩ resistor $R_9$ and a 5KΩ resistor $R_{10}$. The voltage at the connection point of the resistors $R_9$ and $R_{10}$ turns on a transistor $Q_{11}$ and thereby turns off the transistors $Q_{14}$ and $Q_{15}$. This causes the transistor $Q_{18}$ to assume a cut-off state. Thus, even if the power voltage becomes high, the transistor $Q_{18}$ does not turn on.

Here, it is noted that, if the disconnection of the wire to the battery B happens when the temperature of engine is low and while the transistor $Q_{18}$ is conductive, the transistor $Q_{16}$ and $Q_{17}$, which are nonconductive, are likely to turn on due to the high surge voltage to allow a large current to flow. Since the semiconductor resistor P has a high impedance at low temperatures, substantially all of the high current will flow through the transistors $Q_{16}$, $Q_{17}$ and $Q_{18}$. On the other hand, if the disconnection happens while the transistors $Q_{16}$ and $Q_{17}$ are conductive, and when the temperature of the engine is high so that the resistance of the semiconductor resistor element P is low, the transistors $Q_{14}$ and $Q_{15}$ are likely to break down due to the surge voltage to thereby turn the transistor $Q_{18}$ on. Thus, in either case, a large current is likely to flow through the transistors $Q_{17}$ and $Q_{18}$ resulting in breakdown. According to this invention, however, such breakdown of transistors $Q_{17}$ and $Q_{18}$ is prevented by keeping the transistor $Q_{18}$ nonconductive.

This protection is further ensured by the following operation. If the voltage at the power source terminal h further rises above, e.g. 30 volts, the additional Zener diode $D_7$ is rendered conductive in addition to the Zener diodes $D_4$, $D_5$ and $D_6$. As a result, the voltage drop across the resistor $R_8$ rises and its voltage is applied to the bases of the transistors $Q_9$ and $Q_{10}$ through 70Ω resistors $R_6$ and $R_7$ respectively, to turn on these transistors $Q_9$ and $Q_{10}$ and thereby lower the electric potentials at terminals f and e, respectively. Although the transistors $Q_{16}$ and $Q_{17}$ are turned on or driven into more conductive conditions, the transistors $Q_{14}$ and $Q_{15}$ remain nonconductive to keep the transistor $Q_{18}$ in the off state. As a consequence, the electric current flowing through the transistor $Q_{17}$ flows through the semiconductor resistor P rather than through the transistor $Q_{18}$. When the engine is running, the resistance of the semiconductor resistor P is approximately 4Ω. If the peak value of the surge voltage derived from the dynamo G and the saturation resistance of the transistor $Q_{17}$ are assumed to be 80 volts and 0.2Ω, the peak current and peak power dissipation of the transistor $Q_{17}$ are 19 A and 72.2 W, at which values a power transistor used as the transistor $Q_{17}$ will not break down. In contrast, if both the transistors $Q_{17}$ and $Q_{18}$ simultaneously become conductive due to the surge voltage, the current flowing through the transistors $Q_{17}$ and $Q_{18}$ may be approximately 200 A and the transistors will break down instantly.

Further, with regard to the conduction of the transistors $Q_9$ and $Q_{10}$ to make the voltages at the terminals f and e lower, this is important lest the application of an abnormally high surge voltage cause the transistors $Q_{14}$ and $Q_{15}$ to break down and thereby turn on the transistors $Q_{18}$ and cause the breakdown of the transistors $Q_{17}$ and $Q_{18}$. This phenomenon occurs when the temperature of engine is high. But because the temperature of the engine is usually high except just after the engine starts, this phenomenon is to be prevented. According to the embodiment, the voltage at the terminal e is lowered by the conduction of the transistor $Q_{10}$ to prevent breakdown of transistors $Q_{14}$ and $Q_{15}$ and ensure the cut-off condition of the transistor $Q_{18}$. With respect to the lowering of the voltage at the terminal f, the high surge voltage will result in a large current flowing through the emitter base path of the transistor $Q_{16}$, the resistor $R_{15}$, and through the transistors $Q_{12}$ and $Q_{13}$ which comprise the driver to the second transistor combination $Q_{16}$, $Q_{17}$. Since a transistor formed in a semiconductor integrated circuit has a relatively small current carrying capacity, the transistors $Q_{12}$ and $Q_{13}$ are likely to be broken down by this large current. The transistor $Q_9$ is used as an additional current path to bypass the driving current normally flowing through the transistors $Q_{12}$ and $Q_{13}$. That is, the transistors $Q_{12}$ and $Q_{13}$ are protected from breakdown by the conduction of the transistor $Q_9$.

The salient feature of the protector circuit 10 described in conjunction with FIG. 1 resides in the arrangement such that the voltages at the terminals f and e are rendered low only after turn off of the transistor $Q_{18}$. This is so designed because the combination of the transistors $Q_{16}$ and $Q_{17}$ serves as the equivalent of a PNP transistor. More specifically, a surge voltage causes an emitter-base current to flow in the transistor $Q_{16}$ to turn on the transistor $Q_{17}$. If the transistor $Q_{18}$ were also conductive at this instant, a large current would flow through the transistors $Q_{17}$ and $Q_{18}$ to result in the destruction thereof. The three Zener diodes $D_4$, $D_5$, and $D_6$ are therefore provided first to cut off the transistor $Q_{18}$. The additional Zener diode $D_7$ is provided to subsequently lower the electric potentials at the terminals f and e.

With the protection circuit thus far described, a circuit for driving a charge lamp and a semiconductor resistor or the like is adequately protected against a high surge voltage.

In another embodiment of the present invention, the output section of the electronic device to be protected is composed of a single PNP power transistor $Q'_{16}$ and a single NPN power transistor $Q_{18}$ as shown in FIG. 2. The remainder of the circuitry would be the same as in FIG. 1.

In the embodiment of FIG. 2, the Darlington pair of PNP transistors $Q_{16}$ and NPN transistor $Q_{17}$ of FIG. 1 is replaced by a single PNP power transistor $Q'_{16}$. It will be apparent to those skilled in the art that this change does not affect the protection operation explained with reference to the embodiment of FIG. 1.

It will also be apparent that many modifications could be made to the above-described embodiments without departing from the spirit and scope of the invention as defined in the appended claims.

What is claimed is:

1. An electronic device comprising a power terminal for receiving a predetermined voltage, a reference potential terminal, first and second loads connected in series between said power source terminal and said reference potential terminal, first and second transistors connected in series to drive said first and second loads, respectively, first driver means for conducting a first transistor drive current in response to which said first transistor is turned on and second driver means for conducting a second transistor drive current in response to which said second transistor is turned on, a voltage detecting circuit for detecting first and second voltages at said power source terminal to produce first and second detection outputs, respectively, said first voltage being higher than said predetermined voltage and said second voltage being higher than said first voltage, first circuitry responsive to said first detection output for disabling said first driver means to turn off said first transistor, and second circuitry responsive to said second detection output for bypassing the second transistor drive current around said second driver means to said reference potential terminal to protect said second driver means.

2. An electronic device claimed in claim 1, wherein said first driver means receives a power voltage from said power terminal, said power voltage being decreased to further disable said first driver means in response to said second detection output.

3. An electronic device comprising a power supply terminal, a reference voltage terminal, first and second transistors connected in series between said power source terminal and said reference voltage terminal, detection means for producing a first detection signal when the voltage at said power supply terminal is higher than a first predetermined voltage and for producing a second detection signal when the voltage at said power supply terminal is higher than a second predetermined voltage which is higher than said first predetermined voltage, first protection means for driving said first transistor into a cut-off condition in response to said first detection signal, and second protection means for lowering the potential at the base of said second transistor in response to said second detection signal.

4. An electronic device as claimed in claim 3, further comprising a drive stage for driving said first transistor, said driver stage receiving an operating voltage from said power supply terminal, and said second protection means includes means for decreasing said operating voltage in response to said second detection signal.

5. An electronic device as claimed in claim 3 or 4, wherein said power supply terminal receives a power voltage from both of a battery and a dynamo.

6. An electronic device as claimed in claim 3 or 4, further comprising a first load and a second load, said first transistor controlling a current flowing through said first load and said second transistor controlling a current flowing through said second load.

7. An electronic device as claimed in claim 6, wherein said first and second loads are connected in series between said power supply terminal and said reference voltage terminal.

8. An electronic device as claimed in claim 7, wherein said first load is connected in parallel with said second transistor and said second load is connected in parallel with said first transistor.

9. An electronic device comprising a power supply terminal, a reference voltage terminal, first and second transistors connected in series between said power supply terminal and said reference voltage terminal, a first detector for producing a first detection signal when the voltage at said power supply terminal is higher than a first predetermined voltage, a second detector for producing a second detection signal when the voltage at said power supply terminal is higher than a second predetermined voltage which is higher than said first predetermined voltage, a driver stage for driving said first transistor, said driver stage receiving an operating voltage from said power supply terminal, first protection means for driving said first transistor into a cut-off condition in response to said first detection signal, and second protection means for decreasing said operating voltage in response to said second detection signal.

10. An electronic device as claimed in claim 9, further comprising a second driver stage for carrying a second transistor drive current in response to which said second transistor is conductive, and third protection means for providing a current path bypassing said second transistor drive current around said second driver stage to said reference voltage terminal in response to said second detection signal.

11. An electronic device as claimed in claim 9 or 10, further comprising a first load and a second load, said first transistor controlling a current flowing through said first load and said second transistor controlling a current flowing through said second load, said second load being connected in parallel with said first transistor.

12. An electronic device as claimed in claim 11, wherein said power supply terminal receives a power voltage from both of a battery and a dynamo.

13. An electronic device, comprising:
first and second transistors coupled in series between a power source terminal and a reference potential, said second transistor having a control voltage applied to its base;
at least one load driven by each of said transistors;
detection means for providing a first detection signal when said power source terminal voltage exceeds a first value and for producing a second detection signal when said power source terminal voltage exceeds a second value higher than said first value;
first protection means responsive to said first detection signal for disabling said first transistor; and
second protection means responsive to said second detection signal for lowering said control voltage.

14. An electronic device as claimed in claim 13, wherein said at least one load comprises a first load connected in parallel with said first transistor.

15. An electronic device as claimed in claim 13, further comprising driving means receiving an operating voltage and driving said first transistor in response to a driving signal, said first protection means disabling said driving signal and said second protection means decreasing said operating voltage.

16. An electronic device as claimed in claim 13 or 15, further comprising second driving means coupled between said control voltage and said reference potential for decreasing said control voltage in response to a second control signal to turn on said second transistor, said second protection means decreasing the potential difference across said second driving means.

17. An electronic device as claimed in claim 13, wherein said detection means comprises a plurality of series-connected Zener diodes with said first and second detection signals being provided at first and second points along said series connection separated by at least one of said Zener diodes.

18. An electronic device, comprising:
first and second transistors coupled in series between a power source terminal and a reference potential;
first ($Q_{14}$, $Q_{15}$) and second ($Q_{12}$, $Q_{13}$) transistor driver circuits having respective operating voltages applied thereto and providing drive currents to said first and second transistors in response to first and second control signals;
at least one load driven by each of said first and second transistors;
detection means for providing a first detection signal when said power source terminal voltage exceeds a first value and for producing a second detection signal when said power source terminal voltage exceeds a second value higher than said first value;
first protection means responsive to said first detection signal for disabling said first control signal; and
second protection means responsive to said second detection signal for decreasing the operating voltage applied to at least one of said first and second transistor driver circuits.

19. An electronic device as claimed in claim 18, wherein said second protection means decreases the operating voltages applied to both of said first and second transistor driver circuits.

20. An electronic device as claimed in claim 19, wherein said at least one load comprises a first load coupled in parallel with said first transistor.

21. An electronic device as claimed in claim 20, wherein said at least one load further comprises a second load coupled in parallel with said second transistor and in series with said first load between said power source terminal and said reference potential.

* * * * *

UNITED STATES PATENT AND TRADEMARK OFFICE
CERTIFICATE OF CORRECTION

PATENT NO. : 4,458,286
DATED : July 3, 1984
INVENTOR(S) : Eiichi Matsumura

It is certified that error appears in the above-identified patent and that said Letters Patent is hereby corrected as shown below:

Column 3, line 6, change "transistor" to --transistors--

Column 4, line 6, change "from" to --form--

Column 4, line 17, change "transistor" to --transistors--

Column 5, line 13, delete "to" and insert therefor --for--

Column 6, line 37, change "drive" to --driver--

Signed and Sealed this

Twenty-sixth Day of March 1985

[SEAL]

Attest:

DONALD J. QUIGG

Attesting Officer

Acting Commissioner of Patents and Trademarks